United States Patent [19]

Nakano et al.

[11] Patent Number: 4,538,047

[45] Date of Patent: Aug. 27, 1985

[54] METHOD OF CONTROLLING ROBOTIC AUTOMATIC WELDING APPARATUS

[75] Inventors: Teruo Nakano, Toyonaka; Hideji Ohtani, Kobe; Kunio Miyawaki, Ashiya; Shigeo Mogi, Takatsuki, all of Japan

[73] Assignee: Hitachi Zosen Corporation, Japan

[21] Appl. No.: 555,364

[22] Filed: Nov. 18, 1983

[51] Int. Cl.[3] .................................................. B23K 9/10
[52] U.S. Cl. .......................... 219/125.1; 219/124.34; 219/137.71; 901/42
[58] Field of Search ............ 219/124.34, 125.1, 124.22, 219/137 PS, 137.71; 901/15, 42, 18

[56] References Cited

U.S. PATENT DOCUMENTS

| | | | |
|---|---|---|---|
| 2,832,000 | 4/1958 | Steele | 219/137 PS |
| 4,249,062 | 2/1981 | Hozumi et al. | 219/124.34 |
| 4,356,378 | 10/1982 | Cloos et al. | 901/18 |
| 4,396,344 | 8/1983 | Sugimoto et al. | 901/15 |

FOREIGN PATENT DOCUMENTS

1511609  5/1978  United Kingdom .................. 901/42

Primary Examiner—Clifford C. Shaw
Attorney, Agent, or Firm—Barnes, Kisselle, Raisch, Choate, Whittemore & Hulbert

[57] ABSTRACT

An automatic welding apparatus including a robot which comprises a base, a rotary support rotatably mounted on the base, a pair of first arms pivotally movable together and rotatably supported each at its one end by the rotary support, a second arm rotatably supported by the other ends of the first arms at an intermediate portion close to its one end, and a hand connected to the other end of the second arm and rotatable about two axes intersecting each other at right angles. A core wire is supplied from a feeder to a welding torch attached to the hand of the robot. A control device controls movement of the robot, operation of the core wire feeder and power supply to the welding torch. When the forward end of the welding torch comes into contact with the work to be welded, with the core wire drawn into the torch, the resulting short-circuiting is detected to detect the position of the work. The amount of the core wire to be projected from the torch is controlled with reference to the position of the work thus detected.

9 Claims, 15 Drawing Figures

METHOD OF CONTROLLING ROBOTIC AUTOMATIC WELDING APPARATUS

The present invention relates to an automatic welding apparatus including a robotic manipulator, and more particularly to an automatic welding apparatus comprising an articulated robot for movably supporting a welding torch.

Figure 1:
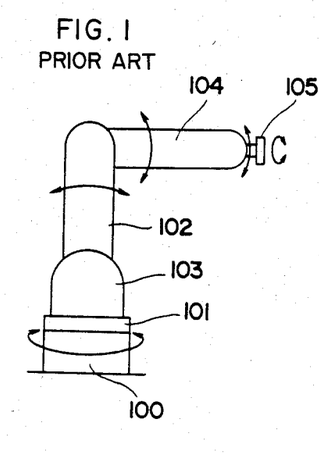
FIG. 1 is a side elevation showing a conventional articulated robot.
Figure 2:
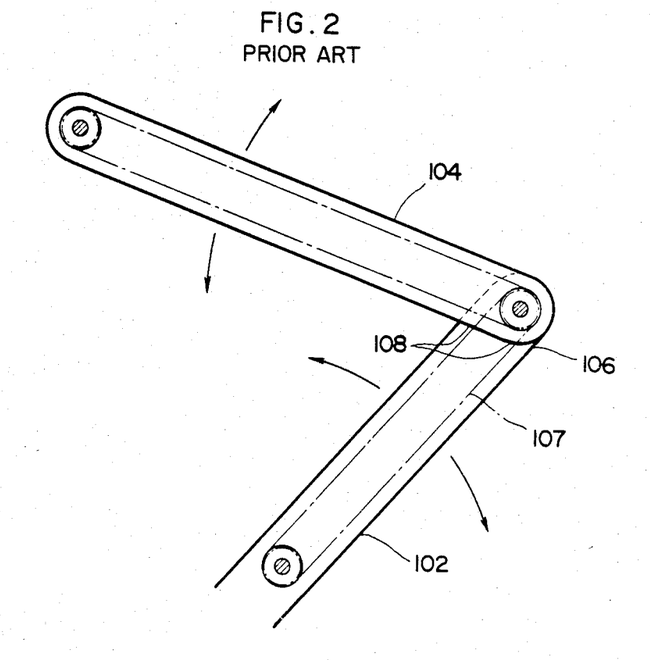
FIG. 2 is an enlarged fragmentary side elevation in section showing the robot.

Conventional articulated robots for use in automatic welding apparatus or the like have the construction shown in FIGS. 1 and 2. The conventional articulated robot comprises a base 100, a rotary support 101 rotatably mounted on the base 100, a first arm 102 rotatably supported at its one end by a bracket 103 mounted on the rotary support 101, a second arm 104 rotatably supported at its one end by the other end of the first arm 102, and a hand 105 connected to the other end of the second arm 104 and rotatable about two axes intersecting with each other at right angles. A welding torch or like suitable tool attached to the hand 105 is adapted to perform welding or like work on a workpiece opposed to the tool by moving the rotary support 101, the two arms 102, 104 and the hand 105 in response to instructions from an unillustrated control device.

With the above construction, however, there is a need to form a cutout 106 in the other end of the first arm 102 to rotatably connect one end of the second arm 104 to the first arm 102 and also a need to form holes 108 in the above-mentioned one end of the second arm 104 for passing therethrough a chain 107 serving as a component of drive force transmission means, so that dust or like extraneous matter is liable to ingress into the arms 102, 104 through the cutout 106 and the holes 108 and result in a malfunction. Further since the size of the cutout 106 is limited, the angle through which the second arm 104 is pivotally movable is small, with the resulting problem that the robot is low in overall work efficiency.

An object of the present invention is to provide an automatic welding apparatus for conducting an efficient welding operation with good stability with use of a robot free of the above drawbacks.

To fulfill this object, the present invention provides an automatic welding apparatus comprising a welding torch for welding the work to be welded, a robot for movably supporting the welding torch, a feeder for supplying a core wire to the welding torch and a control device for controling supply of power to the welding torch, movement of the robot and operation of the core wire feeder, the robot comprising a base, a rotary support swivellably mounted on the base and reciprocatingly rotatable by first drive means, a pair of first arms each rotatably supported at its one end by the rotary support and reciprocatingly pivotally movable together by second drive means, a second arm rotatably supported between the other ends of the first arms at an intermediate portion close to its one end and reciprocatingly pivotally movable by third drive means, and a hand connected to the other end of the second arm and reciprocatingly rotatable about a first axis and a second axis intersecting the first axis at right angles therewith by fourth drive means and fifth drive means, respectively, the hand having the welding torch attached thereto.

An embodiment of the present invention will be described below with reference to the accompanying drawings, in which.

Figure 3:
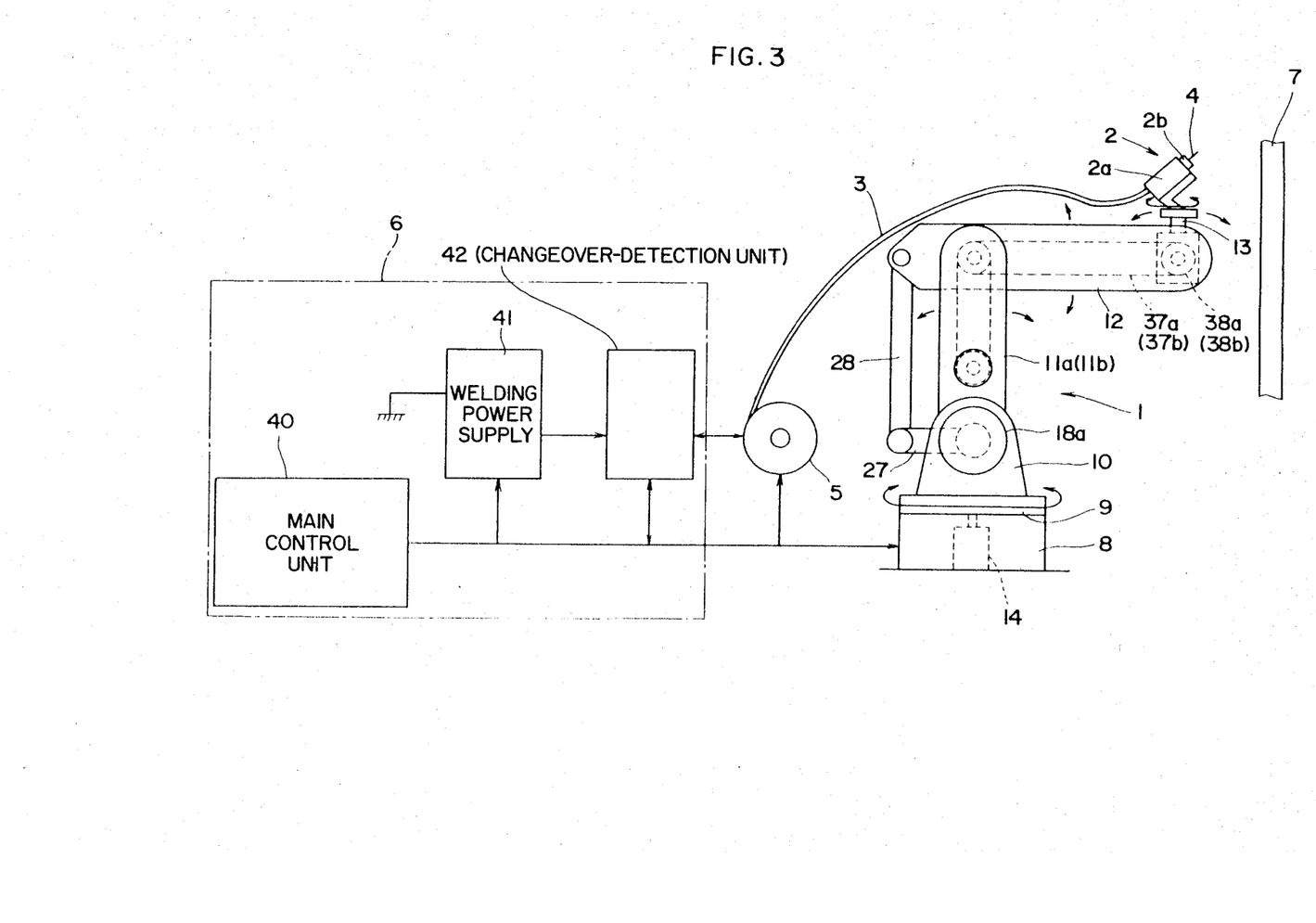
FIG. 3 is an overall diagram schematically showing an automatic welding apparatus embodying the invention.

FIG. 3 shows an articulated robot 1 movably supporting a welding torch 2 comprising a torch main body 2a and a welding tip 2b. Through a composite pipe 3, a core wire 4 is supplied from a feeder 5 to the welding torch 2 by inching or continuously at a high speed. As will be described later, two kinds of power are also supplied to the welding torch via a cable (not shown) extending through the composite pipe 3 in parallel with the core wire 4. The movement of the robot 1, supply of the core wire 4 to the welding torch 2 and power supply to the torch are controlled by a control device 6, whereby work 7 can be welded as specified.

Figure 4:
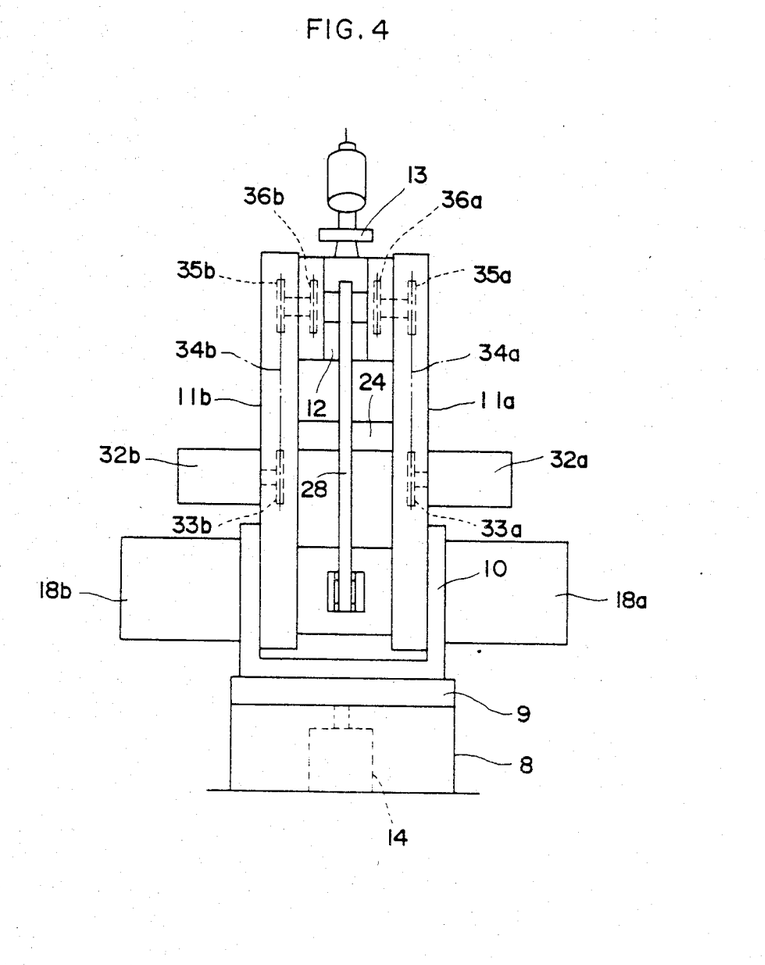
FIG. 4 is a rear view showing only a robot of the apparatus.

As shown in FIG. 3 and FIG. 4, the robot 1 consists essentially of a base 8, a rotary support 9 rotatably mounted on the base 8, a pair of first arms 11a, 11b rotatably supported at their lower ends by a bracket 10 mounted upright on the support 9, a second arm 12 rotatably supported between the upper ends of the first arms 11a, 11b at an intermediate portion close to its rear end, and a hand 13 connected to the front end of the second arm 12 and rotatable about a horizontal axis and a vertical axis. The welding torch is attached to the hand 13. The support 9 is reciprocatingly rotatable by a first drive motor 14 via a reduction mechanism (not shown).

Figure 5:
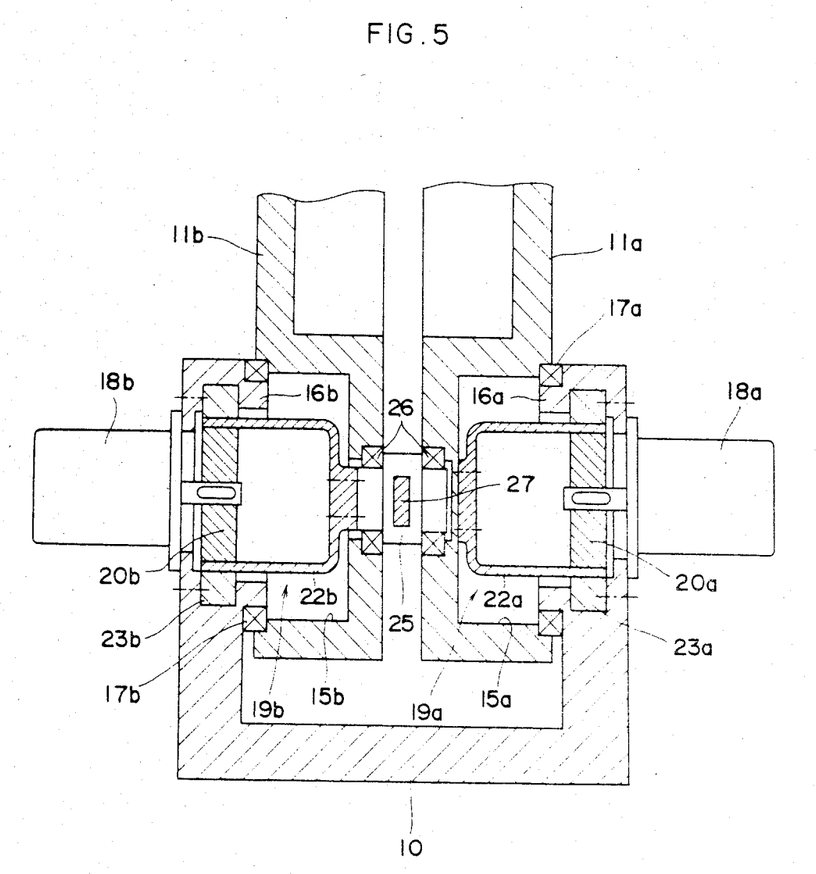
FIG. 5 is an enlarged rear view in section showing a first main portion of the robot.

As seen in FIG. 5. the first arms 11a, 11b are formed at their lower ends with circular recessed portions 15a, 15b which are fitted to annular projections 16a, 16b opposed thereto and formed on the bracket 10, with bearings 17a, 17b interposed therebetween. Attached to one side of the bracket 10 is a second drive motor 18a, which is coupled to one of the first arms, 11a, by a reduction mechanism 19a.

Figure 8:
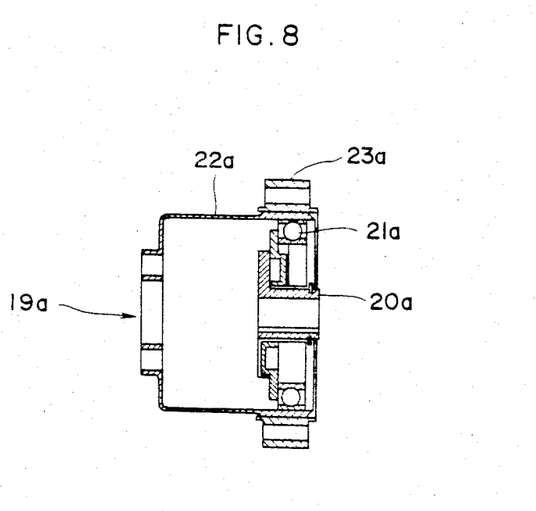
FIG. 8 is an enlarged sectional view showing a reduction mechanism used at various portions of the robot.
Figure 9:
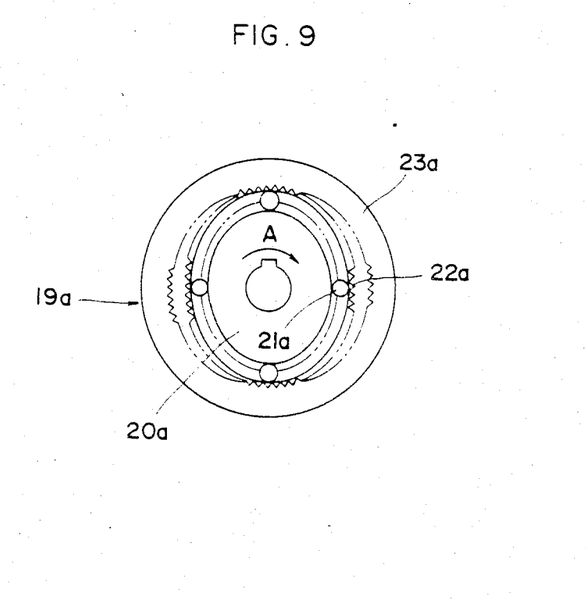
FIG. 9 is a diagram illustrating the principle of operation of the reduction mechanism.

With reference to FIGS. 5 and 8, the reduction mechanism 19a includes a hub 20a keyed to the drive shaft of the motor 18a and having an elliptical outer periphery. A flexible splined member 22a is fitted around the hub 20a with a bearing 21a interposed therebetween and is formed on its outer periphery with engaging teeth. The splined member 22a is bolted to the lower end of the first arm 11a. Some of the engaging teeth on the splined mameber 22a are in mesh with engaging teeth formed on the inner periphery of a rigid circular splined member 23a bolted to the bracket 10. The flexible splined member 22a is slightly smaller than the rigid splined member 23a in the number of teeth.

When the hub 20a is rotated in the direction of arrow A, the flexible splined member 22a is deformed, and engaging teeth thereof come into meshing engagement with the engaging teeth on the rigid splined member 23a in succession. Since the number of teeth on the flexible splined member 22a is somewhat smaller than that of teeth on the rigid splined member 23a as mentioned above, the flexible splined member 22a is subjected to about 1/80 to 1/320 speed reduction to rotate in a direction opposite to the arrow A. Accordingly when the second drive motor 18a is rotated in forward and reverse directions, the first arm 11a bolted to the flexible splined member 22a will move pivotally in reciprocation. With the other first arm 11b connected to the first arm 11a by a connecting member 24 (FIG. 4), both first arms 11a, 11b are pivotally movable together.

As seen in FIG. 5, a transmission shaft 25 is supported by bearings 26 on the lower ends of the first arms 11a, 11b. This shaft 25 is coupled by a reduction mechanism 19b to a third drive motor 18b attached to the other side of the bracket 10. The reduction mechanism 19b has substantially the same construction as the mechanism 19a shown in FIG. 8 in that it comprises a hub 20b, a flexible splined member 22b and a rigid circular splined member 23b except that the flexible splined member 22b is bolted to the transmission shaft 25. A lever 27 has one end fixed to the transmission shaft 25 and the other end connected to one end of a link 28 by a pin (FIG. 3). The other end of the link 28 is connected to the rear end of the second arm 12 by a pin. Accordingly rotation of the third drive motor 18b in forward and reverse directions reciprocatingly pivotally moves the second arm 12 by way of the reduction mechanism 19b, the transmission shaft 25, the lever 27 and the link 28.

Figure 6:
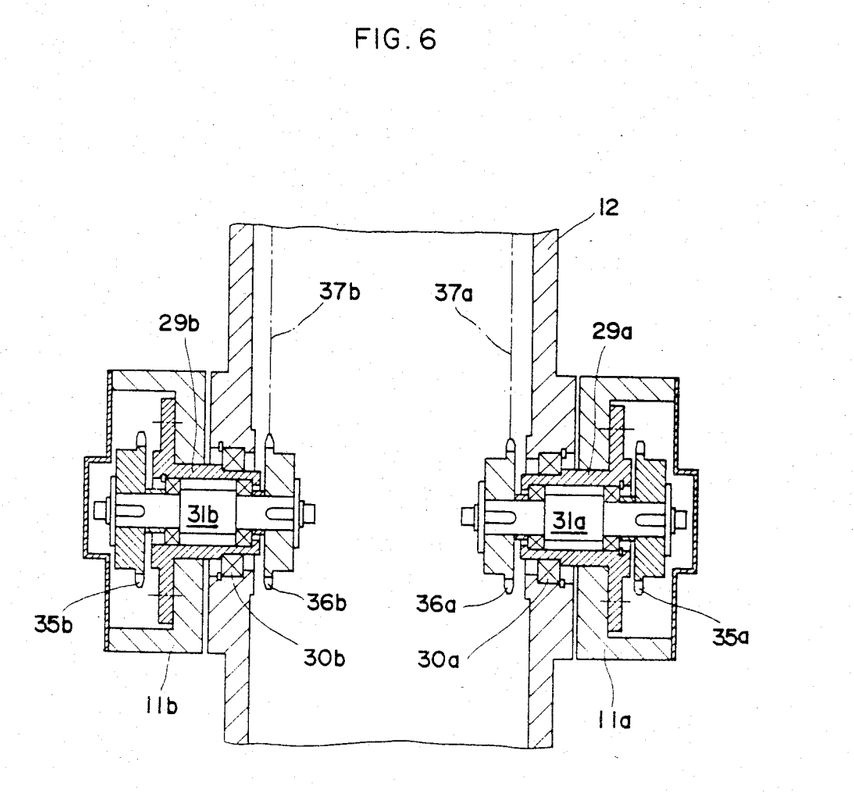
FIG. 6 is an enlarged plan view in section showing a second main portion of the robot.
Figure 7:
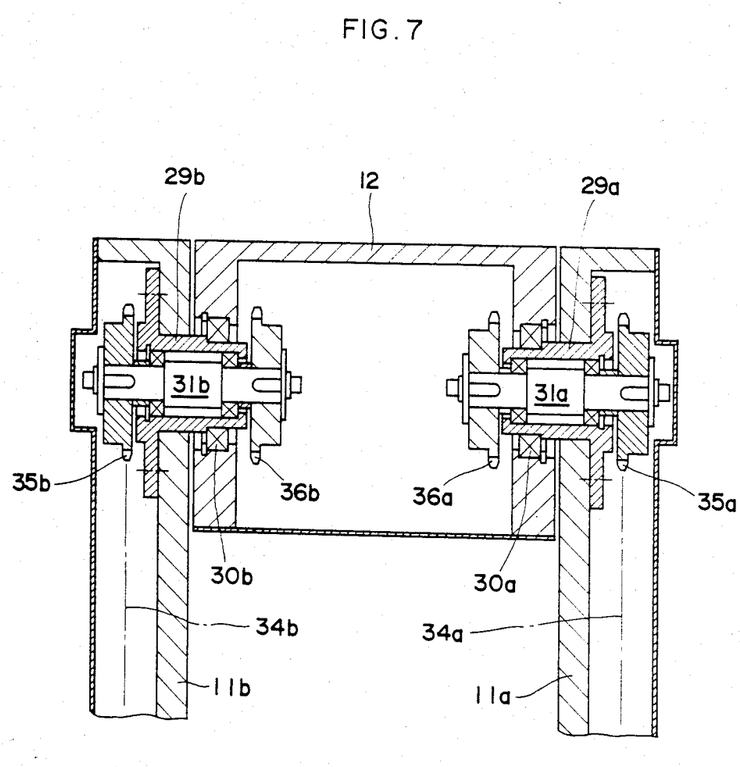
FIG. 7 is an enlarged rear view in section showing the second main portion of the robot.

With reference to FIGS. 6 and 7, bosses 29a, 29b extend through the uper ends of the first arms 11a, 11b and opposite side walls fo the second arm 12. The bosses 29a, 29b are bolted to the first arms 11a, 11b. Bearings 30a, 30b are provided between the second arm 12 and the bosses 29a, 29b. Intermediate shafts 31a, 31b rotatably extend through the bosses 29a, 29b and are supported by bearings fitted therein. A fourth drive motor 32a and a fifth drive motor 32b are attached to the first arms 11a, 11b, each at an intermediate portion of the arm (FIG. 4). These drive motors 32a, 32b are coupled to first sprockets 33a, 33b by reduction mechanisms (not shown) similar to the one shown in FIG. 8. By first chains 34a, 34b, the first sprockets 33a, 33b are coupled to second sprockets 35a, 35b mounted on ends of the intermediate shafts 31a, 31b which ends are positioned within the first arms 11a, 11b. Third sprockets 36a, 36b are mounted on the other ends, positioned within the second arm 12, of the intermediate shafts 31a, 31b. By second chains 37a, 37b, these third sprockets 36a, 36b are coupled to fourth sprockets 38a, 38b rotatably disposed in the interior of the front end of the second arm 12. One of the fourth sprockets, 38a, is functionally coupled to the hand so as to rotate the hand 13 about the horizontal axis. The other fourth sprockets 38b is functionally coupled to the hand 13 so as to rotate the hand 13 about the vertical axis. Accordingly when the fourth drive motor 32a is rotated in forward and reverse directions, the hand 13, i.e., the welding torch 2, is reciprocatingly rotated about the horizontal axis by way of the first sprocket 33a, first chain 34a, second sprocket 35a, intermediate shaft 31a, third sprocket 36a, second chain 37a and fourth sprocket 38a. When the fifth drive motor 32b is rotated in forward and reverse directions, the hand 13 is reciprocatingly rotated about the vertical axis through the first sprocket 33b, first chain 34b, second sprocket 35b, intermediate shaft 31b, third sprocket 36b, second chain 37b and fourth sprocket 38b.

As already stated, the robot 1 of the foregoing structure and the core wire feeder 5 are controlled by the control device 6, which will be described next in detail.

With reference to FIG. 3, the control device 6 chiefly comprises a main control unit 40, a welding power supply 41 and a changeover-detection unit 42. The main control unit 40 gives various instructions to cause the robot 1 and the core wire feeder 5 to operate as specified and also controls the welding power supply 41 and the changeover-detection unit 42. The welding power supply 41 operates in response to a welding mode signal from the main control unit 40 to supply the power required for welding to the welding torch 2 via the changeover-detection unit 42.

Figure 10:
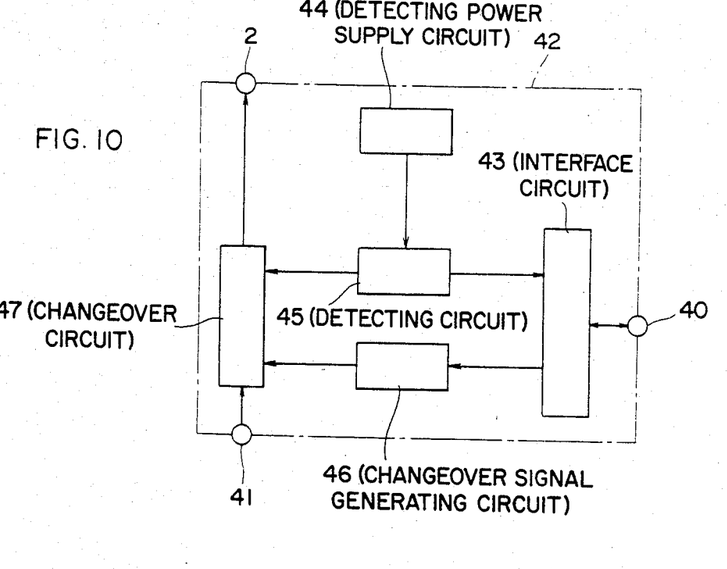
FIG. 10 is a block diagram showing the main construction of a control device included in the automatic welding apparatus.

With reference to FIG. 10, the changeover-detection unit 42 comprises an interface circuit 43 for transmission of signals with the main control unit 40, a detecting power supply circuit 44 for generating a high d.c. voltage of 500 V, a detecting circuit 45 for detecting short-circuiting at the welding torch 2, a changeover signal generating circuit 46 and a changeover circuit 47. In response to a detecting mode signal received from the main control unit 40 via the interface circuit 43, the changeover signal generating circuit 46 generates a first changeover signal to switch the changeover circuit 47 so that the detecting power supply circuit 44 comes into conduction with the welding torch 2 via the detecting circuit 45. Further when receiving the welding mode signal from the main control unit 40 through the interface circuit 43, the circuit 46 emits a second changeover signal to switch the changeover circuit 47 so that the welding power supply 41 is electrically connected to the torch 2. When the detecting power supply circuit 44 is in conduction with the torch 2, the detecting circuit 45 detects the contact of the welding tip 2b and the forward end of the core wire 4 projecting from the tip 2b with the work 7 to be welded (FIG. 3), feeding first and second detecting signals to the main control unit 40 via the interface circuit 43.

The operation of the automatic welding apparatus having the above construction will be described with reference to FIGS. 3 and 10 and FIGS. 11a to 11d.

Figure 11A:
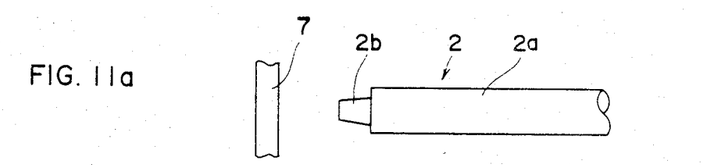
FIG. 11a to FIG. 11d are diagrams illustrating a procedure for projecting a predetermined amount of core wire from a welding torch held horizontally.
Figure 11B:
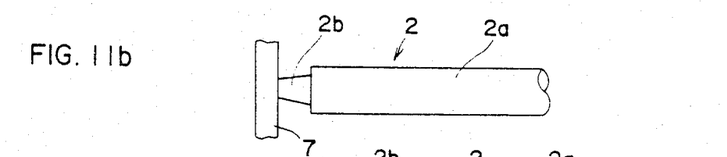
Figure 11C:
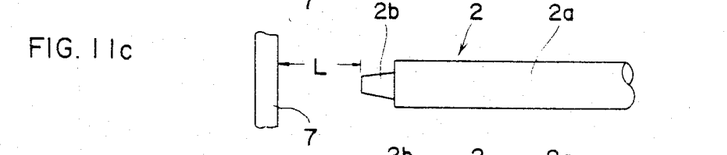
Figure 11D:
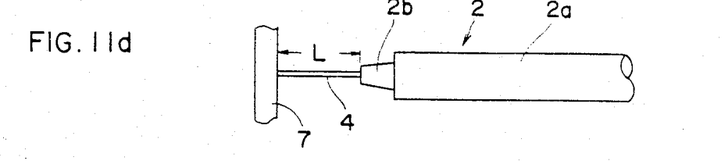

First, in response to an operation instruction from the main control unit 40, the core wire 4 is automatically drawn into the welding torch 2, and the robot 1 operates to bring the welding torch 2 to a location at a suitable distance away from the work 7, whereupon the torch 2 is halted as held horizontally (FIG. 11a). Subsequently a detecting mode signal is fed to the changeover-detection unit 42 from the main control unit 40, whereby detecting voltage is applied to the torch 2 from the power supply circuit 44 via the changeover circuit 47 and the detecting circuit 45 as stated above. Almost simultaneously with this, the robot 1 operates in response to an operation instruction from the main control unit 40 to bring the torch 2 toward the work 7 while holding the torch in its horizontal position. Upon the welding tip 2b of the torch 2 coming into contact with the work 7 (FIG. 11b), the resulting shorting is detected by the detecting circuit 45, which in turn feeds a first detecting signal to the main control unit 40 through the interface circuit 43. Thus the position of the work 7 is stored in the unit 40. In response to the first detecting signal, the main control unit 40 moves the robot 1 until the torch 2 is brought away from the work 7 by a predetermined distance L while allowing the torch to retain its horizontal position (FIG. 11c). Subsequently the main control unit 40 inches the core wire feeder 5 to progressively project the core wire 4 from the welding tip 2b. When the core wire end comes into contact with the work 7 (FIG. 11d), the resulting shorting is detected by the detecting circuit 45, which delivers a second detecting signal to the main control unit 40 via the interface circuit 43. In response to the second detecting signal, the control unit 40 stops the core wire feeder 5. When a predetermined amount of core wire has been projected from the torch 2 in this way, the apparatus is almost ready for welding operation.

In the next stage, the weld line to be formed on the work 7 is detected by a known method. For example, when the weld line is straight, the robot 1 is moved to bring the projecting core wire 4 close to the starting end of the weld line, with the detecting voltage from the detecting power supply circuit 44 applied to the torch 2, i.e., the core wire 4. Next, the starting end position of the weld line is accurately detected by delicately moving the robot 1 and causing shorting at the forward end of the core wire 4. The terminal end position of the weld line is also detected by the same procedure as above. The starting and terminal ends thus detected enable the main control unit 40 to store the straight weld line.

Finally the work is welded along the weld line stored in the control unit 40. More specifically stated, a welding mode signal is fed from the main control unit 40 to the welding power supply 41 and to the changeover-detection unit 42, whereby the power supply 41 is operated and the unit 42 has its changeover circuit 47 switched to apply welding power from the power supply 41 to the welding torch 2. Simultaneously with welding thus initiated, operation instructions are given from the control unit 40 to the core wire feeder 5 and to the robot 1, permitting the feeder 5 to replenish the torch 2 with the core wire 4 continuously and causing the robot 1 to continuously move the torch 2 along the weld line. As a result, the work is welded along the entire length of the weld line.

Figure 12:
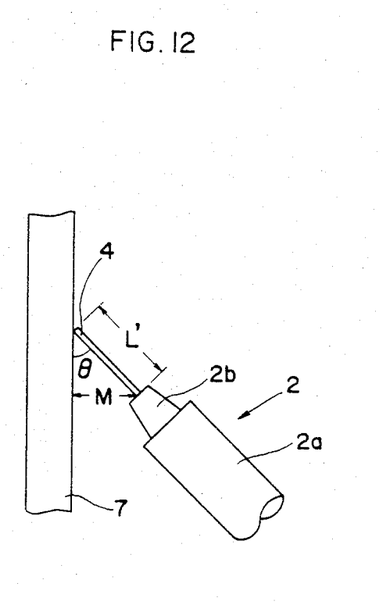
FIG. 12 is a diagram illustrating how a predetermined amount of core wire is projected form the welding torch held inclined.

While the welding operation described is performed by the torch 2 as held in horizontal position, the torch 2 may be inclined for welding. FIG. 12 shows this case in which the core wire 4 is inclined at an angle $\theta$ with respect to the work 7. To position the welding tip 2b at a predetermined distance M from the work 7, the torch is so controlled that the amount of projection, L', of the core wire 4 is M/sin $\theta$. Except this, the apparatus is operated in the same manner as when the torch 2 is held in horizontal position.

What is claimed is:

1. A method of controlling an automatic welding apparatus comprising a welding torch for welding the work to be welded, a robot for movably supporting the welding torch, a feeder for supplying a core wire to the welding torch, and a control device for controlling supply of power to the welding torch, movement of the robot and operation of the core wire feeder, charaterized in that the method comprises the steps of causing the robot to move first until the forward end of the welding torch comes into contact with the work with the forward end of the core wire drawn completely into the torch, subsequently causing the robot to move so that the forward end of the welding torch is brought away from the work by a predetermined amount, and thereafter causing the core wire feeder to inch the core wire until the forward end of the core wire is projected from the welding torch into contact with the work.

2. A method as defined in claim 1 wherein the control device comprises a main control unit for feeding control signals for operating the robot and the core wire feeder as predetermined and other required control signals, a welding power supply operable in response to a welding mode signal from the main control unit, and a changeover-detection unit including a detecting power supply circuit and operable to selectively feed to the welding torch welding power from the welding power supply or detecting voltage from the detecting power supply circuit in response to the welding mode signal or a detecting mode signal from the main control unit and to feed to the main control unit a first detecting signal indicating the contact of the forward end of the welding torch with the work and a second detecting signal indicating the contact of the forward end of the core wire projected from the torch with the work.

3. A method as defined in claim 2 wherein the changeover-detection unit comprises, in addition to the detecting power supply circuit, an interface circuit for transmission of signals with the main control unit, a changeover signal generating circuit for generating a first changeover signal and a second changeover signal upon receiving the detecting mode signal and the welding mode signal, respectively, via the interface circuit, a changeover circuit for bringing the detecting power supply circuit into conduction with the welding torch in response to the first changeover signal and bringing the welding power supply into conduction with the welding torch in response to the second changeover signal, and a detecting circuit for detecting the contact of the welding torch end and the core wire end with the work and feeding the corresponding detecting signals to the main control unit via the interface circuit.

4. A method as defined in claim 1, wherein the robot comprises a base, a rotary support swivellably mounted on the base and reciprocatingly rotatable by first drive means, a pair of first arms each rotatably supported at its one end by the rotary support and reciprocatingly pivotally movable together by second drive means, a second arm rotatably supported between the other ends of the first arms at an intermediate portion close to its one end and reciprocatingly pivotally movable by third drive means, and a hand connected to the other end of the second arm reciprocatingly rotatable about a first axis and a second axis intersecting the first axis at right angles therewith by fourth drive means and fifth drive means, respectively, the hand having the welding torch attached thereto.

5. A method as defined in claim 4 wherein said one end of each of the first arms is rotatably supported by a bracket mounted upright on the rotary support, and the second drive means comprises a drive motor attached to one side of the bracket and coupled to said one end of one of the first arms by a reduction mechanism, the other first arm being connected to said one first arm by a connecting member.

6. A method as defined in claim 4 wherein said one end of each of the first arms is rotatably supported by a bracket mounted upright on the rotary support, and the third drive means comprises a drive motor attached to one side of the bracket, a transmission shaft rotatably provided between said one ends of the first arms and coupled to the drive motor by a reduction mechanism, a lever fixed at its one end to the transmission shaft and a link having one end connected to the other end of the lever by a pin and the other end connected to said end of the second arm by a pin.

7. A method as defined in claim 4, wherein a pair of bosses are fixed to said other ends of the first arms, and the intermediate portion of the second arm close to said one end therof is rotatably supported by the bosses.

8. A method as defined in claim 7 wherein the fourth drive means comprises a drive motor attached to one of the first arms, a first sprocket positioned within said one of the first arms and coupled to the drive motor by a reduction mechanism, an intermediate shaft rotatably extending through one of the bosses, a second sprocket mounted on one end of the intermediate shaft positioned within said one first arm, a first chain coupling the first sprocket to the second sprocket, a third sprocket mounted on the other end of the intermediate shaft positioned within the second arm, a fourth sprocket disposed within said other end of the second arm and functionally connected to the hand for rotating the hand about the first axis, and a second chain coupling the third sprocket to the fourth sprocket.

9. A method as defined in claim 7 wherein the fifth drive means comprises a drive motor attached to one of the first arms, a first sprocket positioned within said one of the first arms and coupled to the drive motor by a reduction mechanism, an intermediate shaft rotatably extending through one of the bosses, a second sprocket mounted on one end of the intermediate shaft positioned within said one first arm, a first chain coupling the first sprocket to the second sprocket, a third sprocket mounted on the other end of the intermediate shaft positioned within the second arm, a fourth sprocket disposed within said other end of the second arm and functionally connected to the hand for rotating the hand about the second axis, and a second chain coupling the third sprocket to the fourth sprocket.

* * * * *